United States Patent
Bolgert et al.

(10) Patent No.: US 9,110,976 B2
(45) Date of Patent: Aug. 18, 2015

(54) SUPPORTING COMPLIANCE IN A CLOUD ENVIRONMENT

(75) Inventors: Anne Louise Bolgert, Austin, TX (US); Raghuraman Kalyanaraman, Austin, TX (US); Randolf Michael Forlenza, Austin, TX (US); Richard Jay Cohen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 12/905,232

(22) Filed: Oct. 15, 2010

(65) Prior Publication Data

US 2012/0096525 A1    Apr. 19, 2012

(51) Int. Cl.
*H04L 9/32* (2006.01)
*G06F 11/30* (2006.01)

(52) U.S. Cl.
CPC ........ *G06F 11/3065* (2013.01); *G06F 11/3006* (2013.01)

(58) Field of Classification Search
CPC ... G06F 21/50; G06F 21/645; G06F 11/3006; G06F 11/3065
USPC .............................................. 726/6; 707/648
See application file for complete search history.

(56) References Cited

U.S. PATENT DOCUMENTS

| | | | |
|---|---|---|---|
| 7,296,056 B2 | 11/2007 | Yaung | |
| 8,380,845 B2 * | 2/2013 | Mercuri | 709/224 |
| 2008/0082538 A1 | 4/2008 | Meijer et al. | |
| 2008/0104393 A1 | 5/2008 | Glasser et al. | |
| 2008/0114817 A1 * | 5/2008 | Gheorghioiu et al. | 707/202 |
| 2009/0198689 A1 * | 8/2009 | Frazier et al. | 707/6 |
| 2010/0333116 A1 * | 12/2010 | Prahlad et al. | 719/328 |
| 2011/0131275 A1 * | 6/2011 | Maida-Smith et al. | 709/204 |
| 2011/0265147 A1 * | 10/2011 | Liu | 726/4 |
| 2011/0321033 A1 * | 12/2011 | Kelkar et al. | 717/174 |
| 2012/0023221 A1 * | 1/2012 | Dayan | 709/224 |
| 2012/0179746 A1 | 7/2012 | Bolgert | |

OTHER PUBLICATIONS

Ahmad, A. et al.; "Common Data Security Network", ACM Digital Library, 2005.

(Continued)

*Primary Examiner* — Joseph P Hirl
*Assistant Examiner* — Thomas Gyorfi
(74) *Attorney, Agent, or Firm* — Robert H. Frantz; Jeffrey S. LaBaw

(57) ABSTRACT

Gathering auditable data concerning actions in a cloud computing environment is automated by determining that one or more auditable data items are available associated with a requester and with at least one application program; responsive to determining that data items are available, transmitting a list of the available auditable data items to a requesting cloud client computer; subsequent to transmitting the list, receiving a data request from the cloud client computer for one or more particular auditable data items from the list; preparing the requested particular auditable data items for transmission according to a predetermined format; and transmitting the prepared requested particular auditable data items to the cloud client computer. Optionally, in some embodiments, the requesting cloud client computer may negotiate a data exchange format with the cloud service provider for receipt of the requested auditable information.

25 Claims, 7 Drawing Sheets

(56) References Cited

OTHER PUBLICATIONS

International Business Machines; IBM Point of View: Security and Cloud Computing, White Paper; Nov. 2009.
Cisco Cloud Computing—"Data Center Strategy, Architecture, and Solutions", White Paper; 2009.
Baize, E. et al.; "RSA Security Brief—Identity and Data Protection in the Cloud", Nov. 2009.
USPTO; Examination Correspondence from a Related Patent Application, U.S. Appl. No. 13/422,285, filed Mar. 16, 2012 by Anne Louise Bolgert.
USPTO; Examination Correspondence from a Related Patent Application(First Office Action), U.S. Appl. No. 13/422,285, filed Mar. 16, 2012 by Anne Louise Bolgert.
USPTO;Examination Correspondence from Related Patent Application, U.S. Appl. No. 13/422,285, filed Mar. 16, 2012 by Anne Louise Bolgert.

* cited by examiner

SUPPORTING COMPLIANCE IN A CLOUD ENVIRONMENT

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

FIELD OF THE INVENTION

The invention generally relates technologies to collect and maintain auditable data and information in a computing environment which is dynamic and scalable in nature, but in which the location and format of the storage of the data is not readily discernable by the customers of that data.

BACKGROUND OF INVENTION

A current trend in Information Technology ("IT") is called "Cloud Computing". Customers who utilize cloud environments can easily access services, application programs ("applications") and computing infrastructure hosted by other companies. Often, this access is "on demand" on an as-needed basis, with dynamic scaling of capacities to fit the instantaneous computing needs of the customer.

Cloud Computing has advantages for customers in that they may be able to reduce the IT costs, physical space (e.g. buildings, rooms, power, air conditioning), and compliance support that they are required to maintain internally. Instead, these costs are shifted to the one or many hosting companies, and the customer then pays only for the computing resources they use.

This is not a total solution to compliance requirements for these customers, though. Customers that use cloud-based services still must support their established company compliance policies. This normally requires that they keep track of specific customer and internal administrative actions with the cloud based services.

For example, cloud service customers may have their own auditing and reporting environments which analyze what their users are doing by correlating data from different applications. The collected and correlated data can be used to produce compliance reports that then are used to track normal operations, and to fulfill audit requirements.

To reduce costs of operation, these customers often prefer to automate audit processes to the maximum extent possible for monitoring audit readiness throughout the year and not just during official audits. When using cloud services, this data is not always readily available, however. If it is, it is usually not enabled for automation and continuous audit readiness monitoring.

Existing audit automation technologies collect audit and log data on IT systems and send it to centralized servers where the data can be analyzed. These technologies require that data collectors know details about the IT systems and the applications that run on them. For example, collector agents need to know where audit data resides and its format.

However, in a cloud environment, a customer may not know where (e.g. which server computer) a particular application is running. Consequently, customers may not be able to rely on collectors to gather and send back the audit data required for analysis.

SUMMARY OF THE INVENTION

Gathering auditable data concerning actions in a cloud computing environment is automated by receiving an auditable data request by a cloud computing server (the request may be from an administrator using a cloud computing terminal device or by another cloud service acting as a client), determining that one or more auditable data items are available associated with a requester and with at least one application program; responsive to determining that data items are available, transmitting a list of the available auditable data items to a requesting cloud client computer; subsequent to transmitting the list, receiving a data request from the cloud client computer for one or more particular auditable data items from the list; preparing the requested particular auditable data items for transmission according to a predetermined format; and transmitting the prepared requested particular auditable data items to the cloud client computer.

BRIEF DESCRIPTION OF THE DRAWINGS

The description set forth herein is illustrated by the several drawings.

DETAILED DESCRIPTION OF EMBODIMENT(S) OF THE INVENTION

This disclosure describes a technology that enable a customer of cloud computing services to acquire auditable data, where the auditable data describes actions and events in the cloud environment which were taken on behalf of or performed for the customer. Embodiments according to the invention include, but are not limited to, a data acquisition protocol and a standardized format for auditable information.

Overview

To acquire the auditable data, a customer (e.g. a user of cloud computing services) queries the cloud provider(s) asking about what audit data the cloud provider has that is relevant to the cloud customer, the cloud provider(s) identifies any and all auditable data available which is related to actions and services provided for the customer. Then, the cloud customer may optionally negotiate an acceptable data exchange format (if not pre-selected), and then may retrieve that data by making audit data requests to the cloud provider(s).

Figure 2:
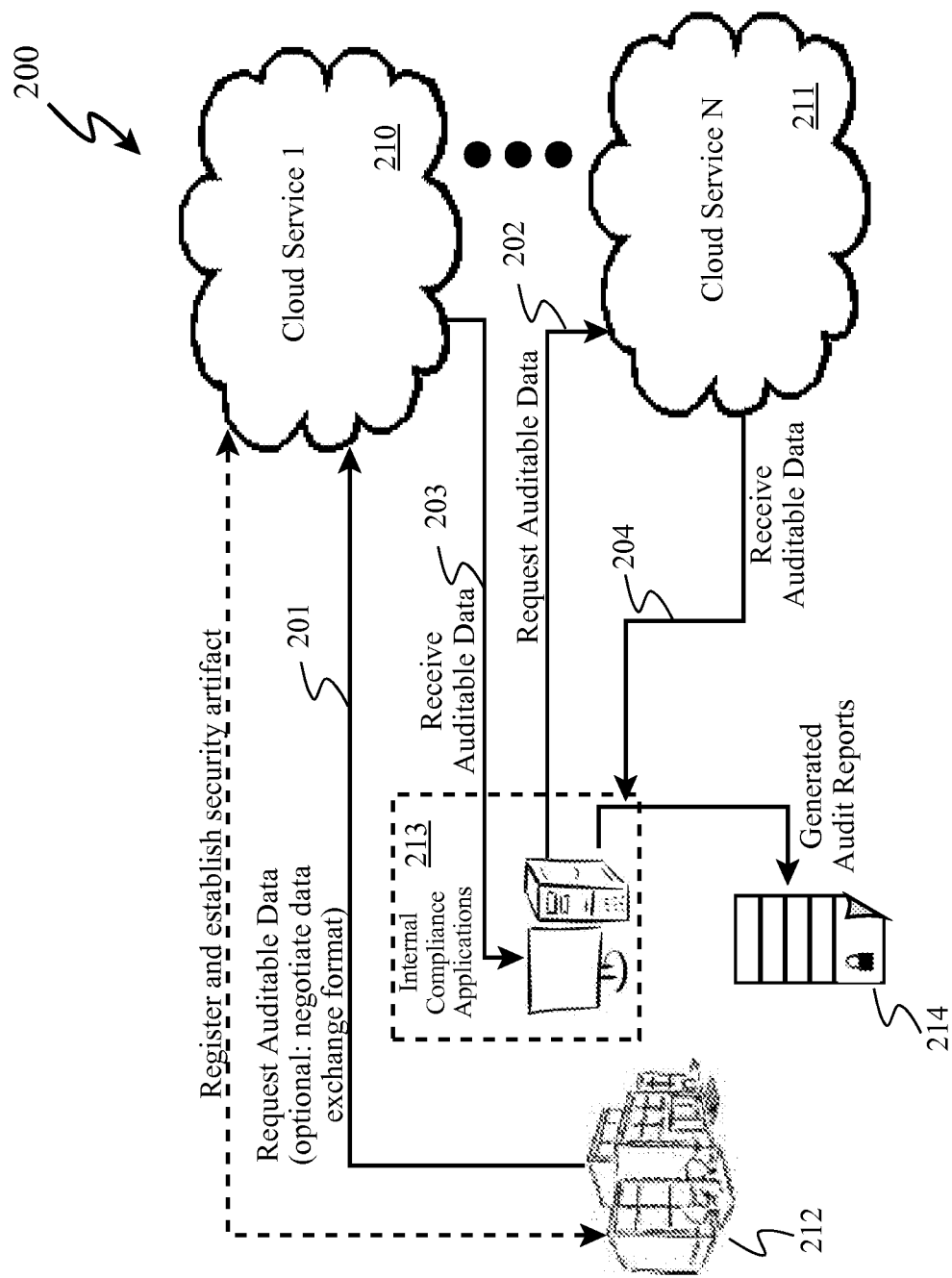
FIG. 2 depicts a logical process according to the present invention in which an enterprise directly and individually requests auditable data from multiple cloud service providers for processing by its own internal compliance tools.

Responsive to the audit data requests, the cloud provider(s) retrieves and sends the auditable data to the customer, who subsequently may use the audit data from the cloud provider and along with audit data from other entities as input to the customer's own (e.g. local, non-cloud) audit and compliance initiatives. The client device may need to translate the received auditable data from the cloud provider into a "local" format that can be used by existing customer tools. An advantage of this process is that the cloud service user can integrate data from cloud services into their existing, automated compliance infrastructure. FIG. 2 illustrates such a logical process (200), in which the customer entity (212), an enterprise of some type, has its own internal compliance tools (213). So, the enterprise (212) posts individual requests for auditable data (201, 202) to multiple cloud services (210, 211), and received multiple, separate blocks of auditable data (203, 204) from those cloud services in return. This information is then integrated "in house" by the customer's compliance tools (213), processed, and a report is generated (214).

Figure 3:
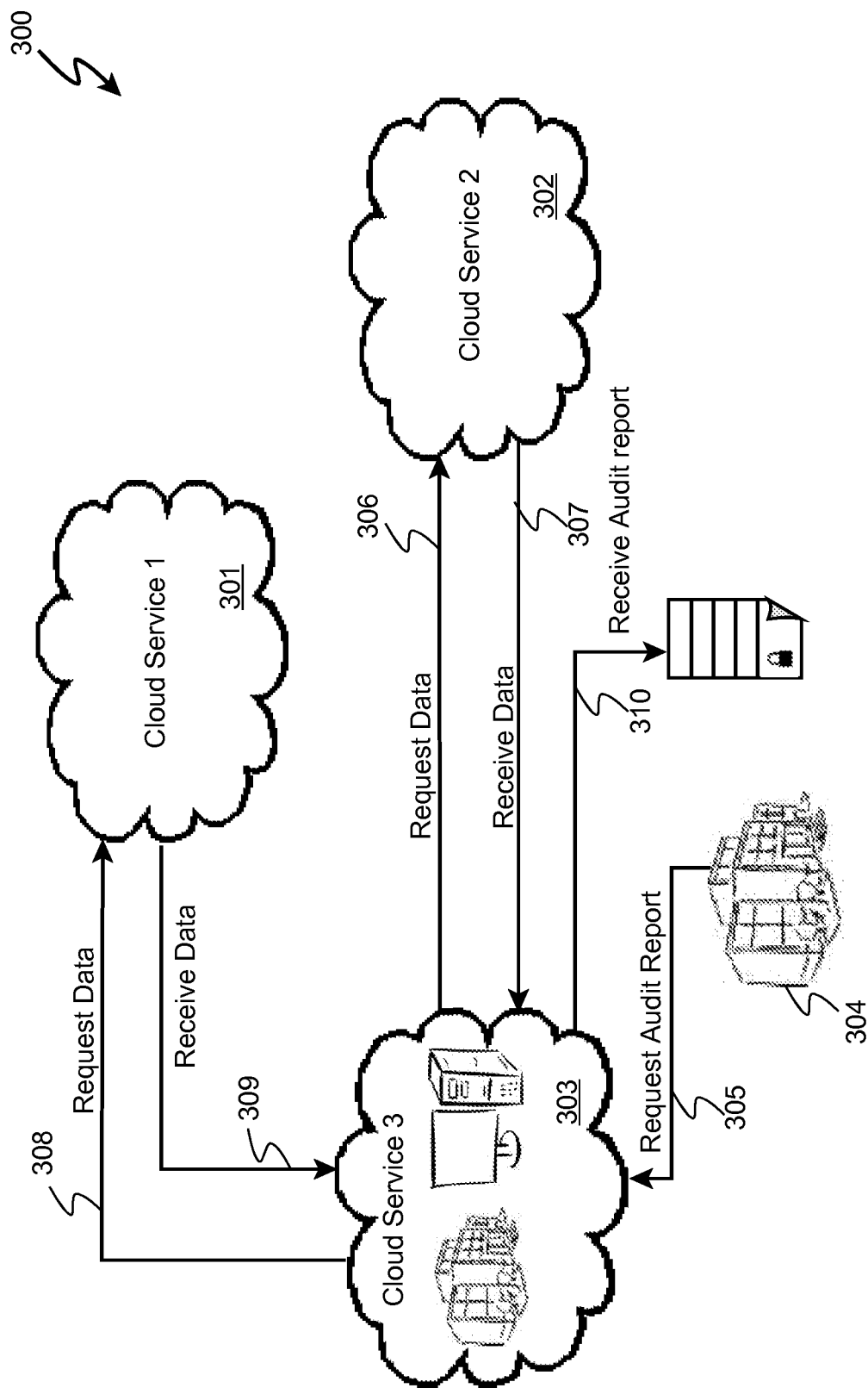
FIG. 3 illustrates third-party handling of compliance auditing within a cloud computing environment.

An additional advantage of another available embodiment is that by generalizing cloud audit services and the protocol to request and receive the auditable data, a third-party cloud service provider can offer "compliance" cloud services to provide auditing and reporting services for customers using multiple service providers, as shown in FIG. 3. In this depiction (300), a third-party cloud service (303) may receive a broad request (305) for compliance auditing of all cloud-based services which have been performed for a particular customer (304). This third-party cloud service may then request (306, 308) auditable data from multiple cloud services (301, 302, etc.) relevant to that customer (304). The data is received (309, 307) from the cloud services by the third-party compliance service (303), instead of being received directly by the customer (304), where it is processed according to compliance policy by the third-party service. The third-party service may reformat the auditable data received from various cloud service sources into a common or local data format, such as a format negotiated between the client device and the cloud service provider. An audit report (310) is then returned to the requesting customer (304), thereby eliminating the need for the customer to have their own compliance auditing process and tools.

Compliance Service Protocol

According to one aspect of one available embodiment of the present invention, a new method of cooperation and interaction between computer application programs to request and retrieve certain auditable data from a cloud computing system is realized, where the application programs may be executed on the same computing platform or they may be executed on separate computing platforms interconnected by a suitable communication technology.

In general, compliance data according to this embodiment is retrieved using the following phases of a user interface:
1. A cloud services customer identifies himself to the cloud service using a terminal device, such as a computer with web browser, smart phone, etc. One such process according to the invention, and according in part to conventional cloud client registration, is:
    a. Generally speaking, all cloud service clients must register and get "boarded" into a cloud service. During the registration exchange between the new client device and the cloud service provider, the cloud service provider creates a unique identifier (e.g. 'serial number') identifying the new client, which is provided to the client device for future identification in transactions with the cloud computing environment.
    b. In addition to the unique identifier being created and sent to the new client device during registration, for further security, the cloud service provider creates a secure artifact stored only by the client device and the cloud service provider, such as a token, a certificate, asynchronous (e.g., RSA) or synchronous keys, or a combination of these artifacts.
2. Subsequent to registration and security processes, the cloud services customer asks the cloud provider what compliance data is available for the applications that the customer is both entitled to use and is actually using.
3. Responsive to receiving the results from the customer's query, the cloud services customer selects only the available auditable data which he wants to receive from the cloud provider, also performed using the terminal device.
    a. Unless a specific data interchange format is pre-selected between the new client and the cloud service provider, there optionally may be a process to find and select a data interchange format supported by both the client device and the cloud service provider. When a data interchange format has been selected, the client, the service provider, or both may need to reformat stored data to the selected exchange standard. Additionally, it should be noted that this may also require that the client device and probably the cloud service provider server may have to perform data translation differently on data received from different cloud sources from the varied applications it provides or supports on behalf of the client.
    b. In one possible embodiment, the client may indicate that "raw data" is the data interchange format to be selected, but optionally according to other embodiments, the client device may request a data in a form of an electronic report from the cloud service provider.
4. Upon receipt of the selected auditable data, the cloud services customer may use the auditable data for compliance analysis and reporting according to his or her own compliance tools.

According to one embodiment, cloud service consumers can only retrieve data from sources to which they are entitled. For example, consumers cannot access data from a service for which they have not contracted or used, nor can they retrieve data from a source relevant to another entity but not relevant to themselves.

Figure 1:
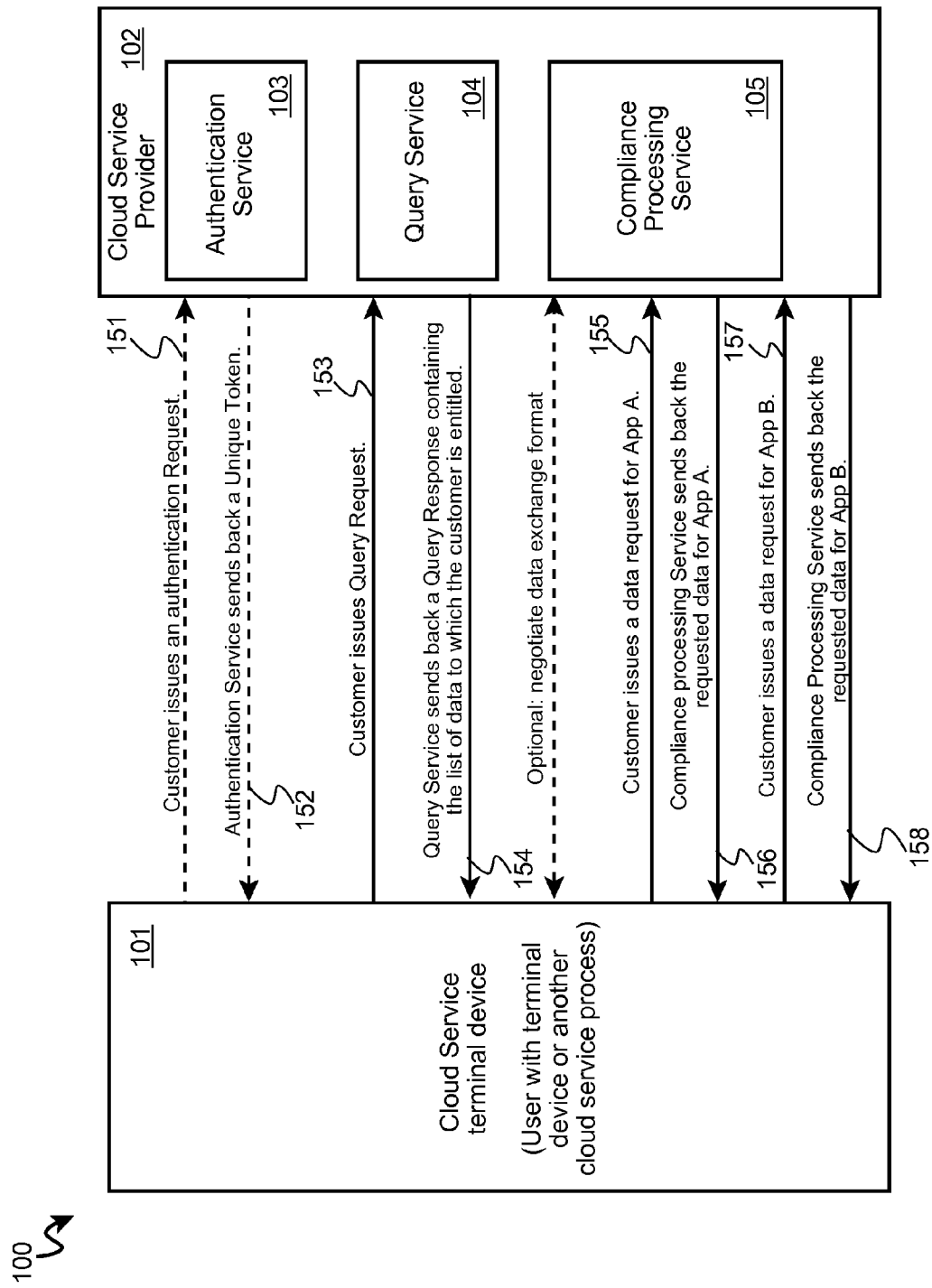
FIG. 1 illustrates a protocol method of interaction between a cloud service provider server computer and the terminal device used by a cloud services customer (or another cloud process acting as a client) according to the invention.

A more detailed example embodiment (100), provided from the perspective of the cloud service host or hosts, is shown in FIG. 1. Note that the data can be passed on a secure connection using protocols such as Secure Socket Layer ("SSL") or Transport Layer Security ("TLS"). The protocol shown in FIG. 1 can be implemented by automated compliance monitoring systems to request data at scheduled intervals.

Responsive to the cloud service (including a computing platform) (102) receiving (151) an authentication request from a customer's terminal device (101), a unique token is created or selected (103) and transmitted (152) from the cloud service to the terminal device.

Subsequently, the cloud service receives a query request (153) including the token from the terminal device, which triggers the cloud service to search for and determine (104) what auditable data it may have stored relevant to the customer and relevant to any services performed for the customer. A query response is transmitted (154) to the customer's terminal device containing a list of any auditable data which is available, and preferably filtered to contain only data to which the requesting customer is entitled.

Still subsequently, the cloud service receives (155) a data request from the customer's terminal device, such as a request for auditable data associated with Application Program "A". The cloud service retrieves or produces (105) the requested compliance data (e.g. auditable data) if the customer is entitled to the requested data, and transmits (156) it to the customer's terminal device. Additional data requests (157, 158, 103, 104, 105) for auditable data may be further handled in the same manner, such as a second request for auditable data associated with Application Program B, and so forth, until a terminal condition occurs, such as the expiration of the token, or all available data has been transmitted.

According to one available embodiment, the following details of the foregoing process can be realized for certain advantages.

Query Request. The initial API call is a query asking the service what audit data is available. The query can contain the following parameters: query version, customer name, a unique token obtained from an authentication request, a time range of requested data, and a timeout of query specifying how long to wait for a response.

Query Response. The response can contain the following information based on the parameters passed as part of the query: query response version, cloud service Identifier (uniquely identifies the cloud service provider), query response ID, query result expiration time (i.e. how long can I use this response ID), and a list of applications in that cloud environment that have data available to which the customer is entitled. The information that may be included in the list of applications that have auditable data for the customer may include: application name, cloud application Identifier that uniquely defines the application and instance of the application the cloud customer is using and from which auditable data is available (Unique application ID, Unique application instance ID, Unique customer ID), a list of event categories that are available for each application (Security Events, Application Events, System Events, Business Events, Compliance Events, Security Violation Events, and Auditing Events), an indication of the quantity of data for each application in the requested time frame matching the input filter (e.g. gross size of data or transfer time estimate), and a type indicator of the data (e.g. Syslog, Windows Event log, Unix Event log, Application specific event log format, CBE/WEF, Generic/W7) (e.g. data exchange format indicator).

Data Request. The data request can contain the following information: request version, the unique token obtained during authentication, a query response ID returned in the initial query, the Application ID which specifies which application data should be returned, and a type indicator (selecting a type or format of the data if multiple types were available). If a preferred data exchange format is not in the list from the cloud service, then, optionally, the data request can also contain a indication of a requested data exchange format, or may contain an indication of selection of a standard format (e.g. preselected), which may be converted to a local preferred format by the client device.

Compliance Service Data Format. The cloud service provider retrieves, formats, and in some instances, produces, the requested compliance data, and transmits it to the customer's terminal device in a format useable by the cloud customer to complete compliance analysis and reporting. In one available embodiment according to the invention, compliance data is transmitted in two parts: a header part and a content part. The header contains metadata that describes the compliance data, and the content part contains the actual compliance data. The format is described in the header so that the consumer's compliance programs can interrogate the header to determine how to process the data appropriately. The header can contain the following data: header version, data offset, provider identifier (cloud service), an indication of which application program or service the data came from, a time range that the data covers, an indicator of the Format of the data, a total size of the data (in bytes or other units), the size of each block of data, a Number (N) of blocks of data, a sequence number of data (Block X of N), a checksum, and an indicator of the checksum algorithm used to generate the checksum. In some embodiments, conversion of the auditable data from the format in which it is received from the cloud sources into a format useful to one or more compliance applications may be required.

Examples of Operation

Companies set up compliance policies, then create compliance initiatives to monitor and audit their environment to prove compliance. In a non-cloud environment, it is easier to collect compliance data, in particular in the form of events, from their internal environment because they have physical access to the computers (servers, clients, etc.) where the applications were executed or are currently running. In such a non-cloud environment, administrators can physically go to each computer, and configure the computer and the application programs on the computers to record audit data in the form of event logs. Administrators can then gather that event or other audit-related data from those computers, such as collecting the information on a regular schedule or on demand from an auditor, in order to monitor and verify compliance to the company, industry, and governmental compliance policies.

However, in a cloud computing environment, either Hybrid or Public (or even Private cloud because the cloud environment is owned by a different part of the business), it is difficult if not impossible to collect audit data using this traditional process which requires physical and administrator-level access to the computers which are running application programs on behalf of a particular customer. Cloud Service users typically do not know where and do not have access to the environments where the cloud services are running.

Embodiments according to the present invention allow cloud service customers to access to their audit data by asking the cloud service for the data they need to demonstrate compliance.

The following examples are provided in order to show how a cloud service customer would ask for audit data from the cloud environment with various embodiments of the invention. This set of examples is not meant to convey the only possible method of using and implementing the invention, but instead, are meant to illustrate some possible embodiments of the invention.

Scenario 1: Company ABC needs to make sure that they keep track of what their users are doing during business hours to make sure they are using cloud services according to company, industry, and potentially governmental policies and regulations. In this first example scenario, the administrator/auditor may need to obtain all events showing user access to Cloud applications.

An example markup-language list of available audit data might appear as follows:

```
...
(available_audit_data)
    (type)database record access(/type)
    (filters)by_user, by_date,by_organization(/filters)
    (/source)server_19(source)
    (data_location)kansascity_ center(/data_location)
(/available_audit_data)
(available_audit_data)
    (type)scm_orders(/type)
    (filters)user, date, value, quantity, commodity(/filters)
    (/source)server_92a(source)
    (data_location)houston_data_ center(/data_location)
(/available_audit_data)
...
```

In this example, two data centers in the cloud, one located in Kansas City and another located in Houston, have reported availability of auditable information. The first server (Kansas City) has data base record transactions which can be requested and filtered by user, date, and organization. The second server (Houston) has supply chain management (SCM) orders which may have been created, deleted, viewed, or modified, and can be filtered by user, date, quantity, and commodity code of the item(s) ordered. Location of the servers may be of interest because certain policies and regulations may be applied only to certain locations and political or legal jurisdictions.

Scenario 2: Cloud services typically provide administrator interfaces into the cloud environment to allow a customer-appointed cloud administrator to manage cloud resources for the other customer cloud service users. In this example, the cloud service user wants to keep track of who has been given access to cloud services in the company to check policies like Separation of Duty, and others. In this example scenario, a query to receive all events showing new users being allowed to access the cloud services may be made, and the returned list of available auditable data may take a format similar to that shown in Scenario 1.

Scenario 3: Companies have to comply with various compliance regulations. These regulations may be very specific as to what type of data needs to be audited. For example privacy regulations need to monitor data associated with users and user preferences. For this example scenario, a query to receive all events of access to user personal information by employees of Company ABC via cloud services could be made.

Scenario 4: Companies need to feel confident that cloud services have a certain level of security and have security controls in place. This can be achieved by retrieving all events related to security and audit trails, such as requesting all events related to cloud administrator maintenance activity on resources that the company uses. In some situations, a cloud administrator may request an electronic report rather than raw data during the data exchange interface negotiation phase. Such an electronic report may take the format of a data sheet (e.g. Microsoft Excel™, Lotus 1-2-3™, Corel Quattro™) a word processor document (e.g. Microsoft Word™, Lotus WordPro™, Corel WordPerfect™, Adobe Portable Document Format™, etc.), or a generic electronic document format such as Rich Text Format (RTF), ASCII or ANSI text format, and Comma Separated Values (CSV).

Example API

The following is a more detailed example of an Application Programming Interface (API) according to the invention. It will be readily recognized by those ordinarily skilled in the art that alternative API's may be realized in accordance with the invention, as well, and that the following is provided for illustration of at least one embodiment of the invention.

Authentication. In some embodiments, security may be required to prevent unauthorized gathering of auditable information from the cloud computing environment. In such embodiments, it may be useful to have a user or tenant authorization interface:

cloudAuthnRequest( )
    Authenticates a user to the cloud
    Syntax
        tokenID cloudAuthnRequest(company, username, password);
    Parameters
        company—Name of the company for the given user
        name—Name of the requestor
        password—Password for the requestor
    Description
        Authenticates the requestor to the cloud environment.
    Return
        Returns a unique token containing the requestors credential information Query for Available Auditable Data. The foregoing examples provided illustrations of one possible API for obtaining a list of available auditable data from the appropriately associated servers in the cloud. The following example is more detailed for another possible API realization of this function:

queryCloudLogData( )
    Retrieves a list of audit log data to which the user is entitled.
    Syntax
        queryResults queryCloudComplianceData(TokenID, requestData, timeout);
    Parameters
        tokenID—Unique identifier for the requestor
        requestData—Structure containing the parameters for the data request including the query version, and time range of the requested data
        timeout—Length of time to wait for the response
    Description
        Queries the cloud service provider for a list of available audit data based on the specified parameters.
    Return Value
        A structure containing the response data including the version number, service identifier, a response identifier, the expiration of the response, and a list of available audit logs and their attributes.

Retrieval of Available Auditable Data. The foregoing examples provided illustrations of one possible API for obtaining available auditable data from the appropriately associated servers in the cloud. The following example is more detailed for another possible API realization of this function:

getCloudLogData( )
    Retrieves a set of audit logs from the cloud service provider
    Syntax
        dataLogs getCloudLogData(tokenID, serviceID, responseID, logDataReq, prefFormat, timeout)
    Parameters
        tokenID—Unique identifier for the requestor
        serviceID—Identifier of the cloud service
        responseID—Identifier of a response from a previous getCloudLogData( ) call which uniquely identifies the log data query.
        logDataReq—The list of requested logs and associated attributes (dates, types, etc.)
        prefFormat—the preferred format or formats of the data exchange
        timeout—Length of time to wait for the response Description
Retrieves the set of audit logs (identified by the logDataReq parameter) from the cloud service provider. The request will timeout if all of the data is not returned within the time specified by the timeout parameter.

Return Value
Returns a compressed file containing the requested audit log data.

Suitable Computing Platform

Figure 4:
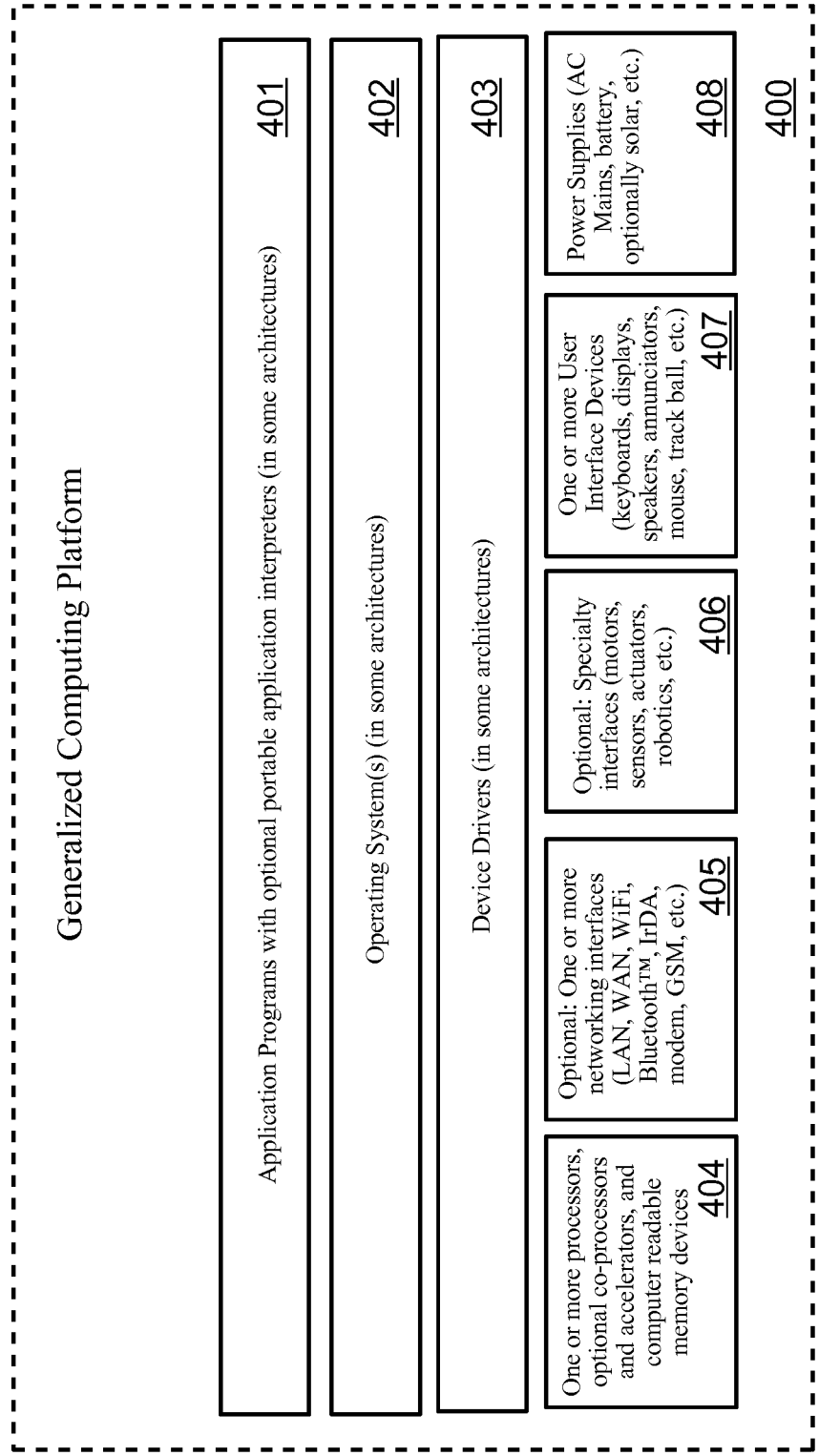
FIG. 4 depicts a generalization of a wide range of computing platforms.

Regarding computers for executing the logical processes set forth herein, it will be readily recognized by those skilled in the art that a variety of computers are suitable and will become suitable as memory, processing, and communications capacities of computers and portable devices increases. FIG. 4 illustrates a generalized computing platform (400), such as common and well-known computing platforms such as "Personal Computers", web servers such as an IBM iSeries server, and portable devices such as personal digital assistants and smart phones, running a popular operating systems (402) such as Microsoft™ Windows™ or IBM™ AIX™, Palm OS™, Microsoft Windows Mobile™, UNIX, LINUX, Google Android™, Apple iPhone™ operating system, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (401) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The hardware portion of a computing platform typically includes one or more processors (404) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (405) may be provided, as well as specialty interfaces for specific applications. If the computing platform is intended to interact with human users, it is provided with one or more user interface devices (407), such as display(s), keyboards, pointing devices, speakers, etc. And, each computing platform requires one or more power supplies (battery, AC mains, solar, etc.).

Cloud Computing

It will be understood by those ordinarily skilled in the art that although this disclosure includes a detailed description which relates to cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
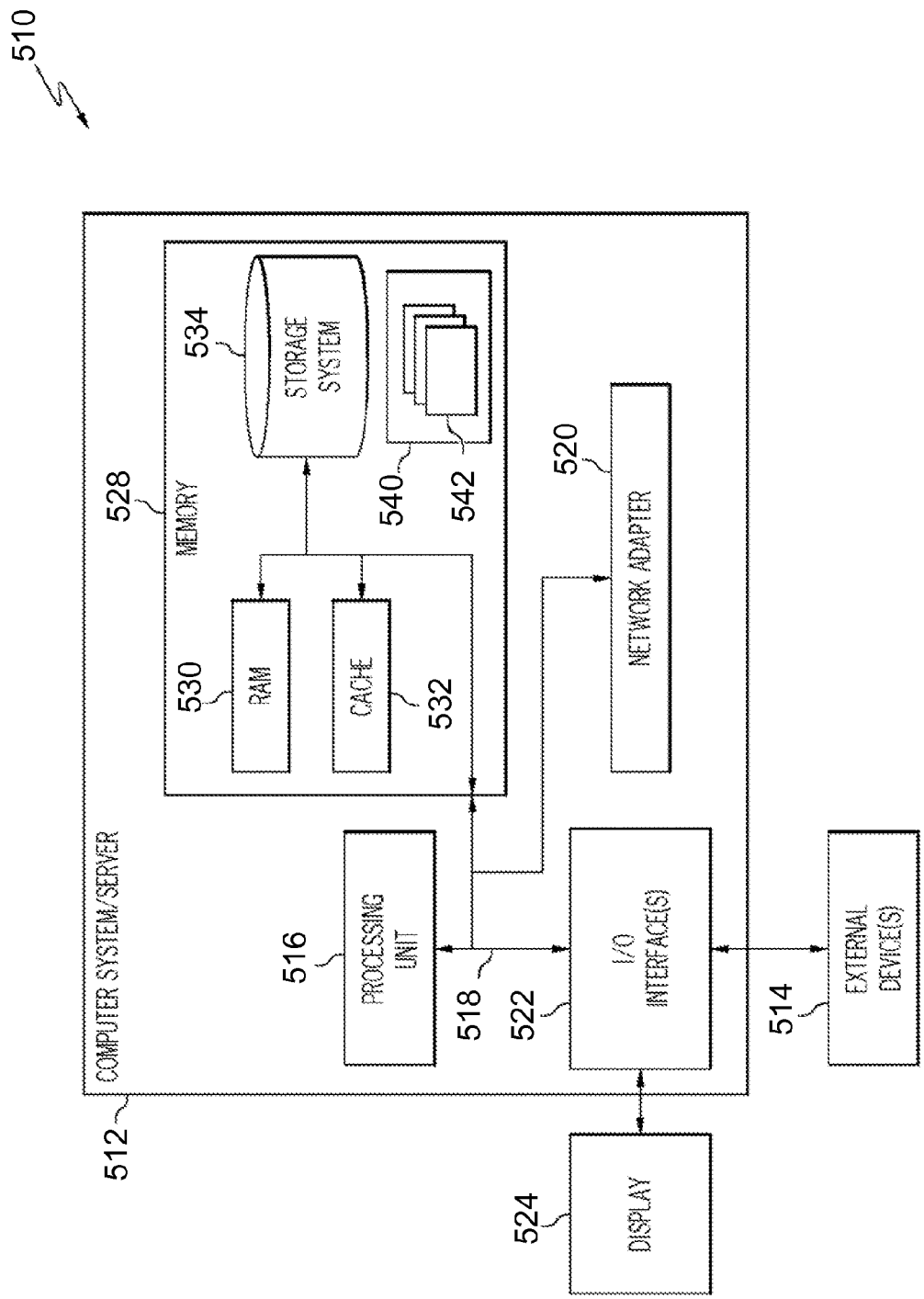
FIG. 5 depicts a cloud computing node according to an embodiment of the present invention.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
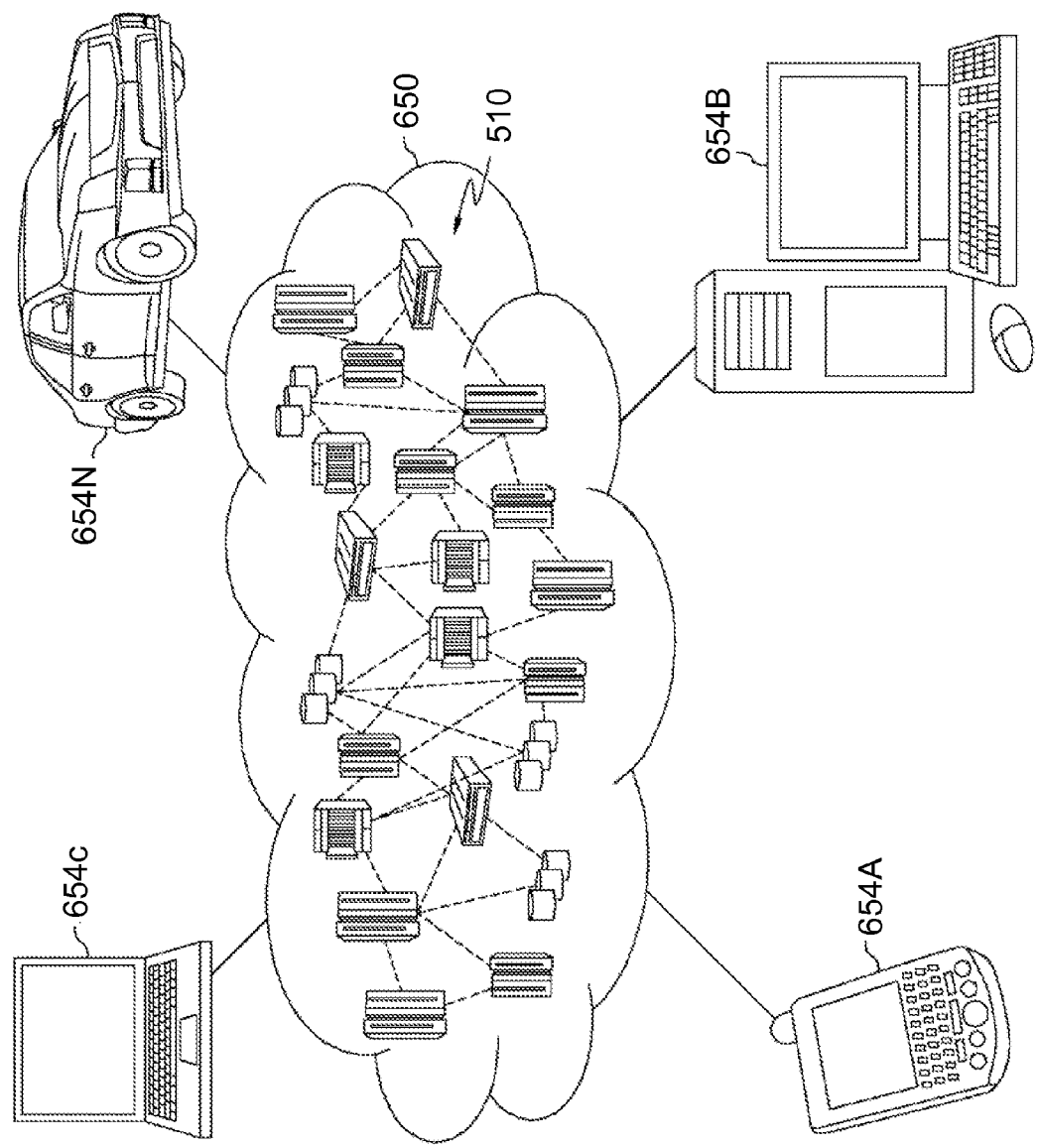
FIG. 6 depicts a cloud computing environment according to an embodiment of the present invention.

Referring now to FIG. 6, illustrative cloud computing environment 650 is depicted. As shown, cloud computing environment 650 comprises one or more cloud computing nodes 510 with which local computing devices used by cloud consumers, such as, for example, personal digital assistant (PDA) or cellular telephone 654A, desktop computer 654B, laptop computer 654C, and/or automobile computer system 654N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 510 and cloud computing environment 650 can communicate with any type of computerized device over any type of network and/or network addressable connection (e.g., using a web browser).

Figure 7:
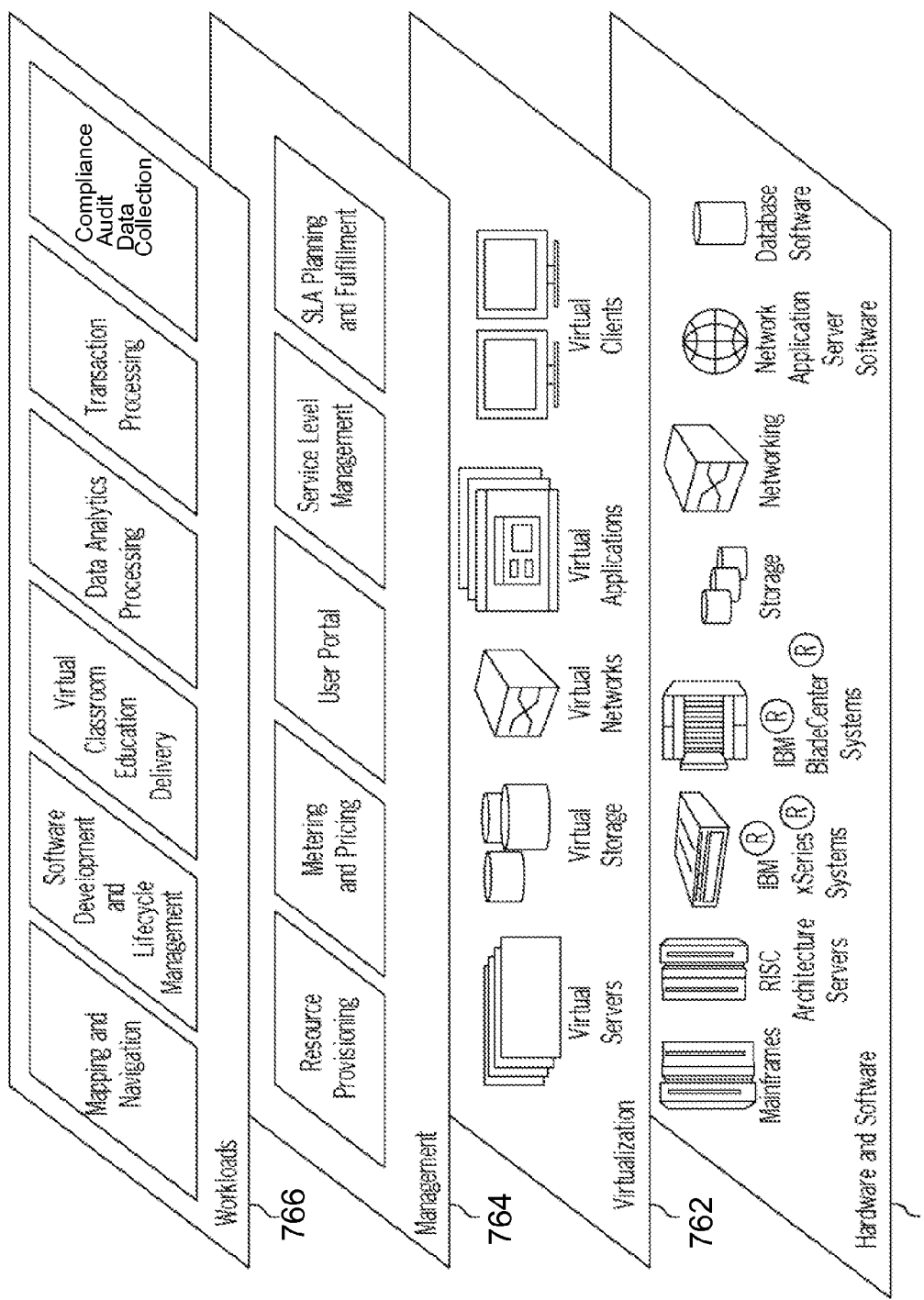
FIG. 7 depicts abstraction model layers according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and supporting compliance with policies and regulations for processes performed in the cloud.

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical device.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer program product for providing auditable data concerning actions in a cloud computing environment, comprising:
   a tangible, computer readable storage memory device;
   program instructions encoded by the tangible, computer readable storage memory device to cause a compliance cloud computing server processor to operate a cloud service which performs the steps of:
   responsive to receiving an auditable data request from a cloud client computer for a customer, querying a plurality of cloud application services for auditable data retained in cloud application services data storage relevant to the customer, resultant from computing actions taken on behalf of the customer;
   receiving one or more responses to the querying from the plurality of cloud application services indicating available retained customer-relevant auditable data items;
   responsive to finding customer-relevant auditable data items stored by the cloud application services, transmitting a list of the available auditable data items to the cloud client computer, wherein the list contains a geographical storage location identifier of each data item;
   subsequent to transmitting the list, receiving from the cloud client computer a selection of less than all of the listed auditable data items;

retrieving from the cloud application services the selected auditable data items;

transmitting to the cloud client computer the retrieved auditable data items;

thereby avoiding a need for the cloud client computer to store the location of auditable data items at the cloud application services; and wherein the querying of cloud application services, receiving responses, transmitting a list, receiving a selection, retrieving the selected auditable data items, and transmitting the retrieved auditable data items are performed as a cloud service separate from the cloud client computer and from the plurality of cloud application services, thereby avoiding the need for the cloud client computer to store the location of auditable.

2. The computer program product as set forth in claim 1 further comprising program instructions to, prior to the receiving of an auditable data request, perform cloud service registration of a client device by creating and assigning a unique identifier to a cloud client computer, and sharing a security artifact between a cloud computing server and the cloud client computer, wherein the sixth program instructions are stored by the computer readable storage memory device.

3. The computer program product as set forth in claim 1 further comprising program instructions to, prior to or concurrently with receiving a data request from the cloud client computer, negotiate between the cloud client computer and the cloud computing server a mutually-agreeable data exchange format in which requested auditable data will be delivered to the cloud client computer, wherein the sixth program instructions are stored by the computer readable storage memory device.

4. The computer program product as set forth in claim 1 wherein the program instructions for determining that one or more auditable data items are available comprise program instructions to determine if the requester is entitled to each of the available auditable data items, and to remove from the list each auditable data item to which the requester is not entitled.

5. The computer program product as set forth in claim 1 further comprising program instructions stored or encoded by the computer readable storage memory device to issue an authentication token to the cloud client computer prior to the receiving an auditable data request, wherein the determining that one or more auditable data items are available comprises extracting the previously-issued token from the auditable data request, and wherein the transmitting of a list of available auditable data items is prevented responsive to the extracted token not being associated with the requesting cloud client computer or responsive to a token being not found in the received auditable data request.

6. The computer program product as set forth in claim 1 wherein the program instructions for preparing of the requested auditable data items further comprises program instructions to perform compliance analysis against one or more compliance policies, and wherein the transmitting of the prepared data items further comprises transmitting one or more results of the compliance analysis.

7. The computer program product as set forth in claim 6 wherein the program instructions for performing of compliance analysis are performed by a cloud service provider computer which is separate from a cloud service provider which received the request for auditable data items and which is separate from the requesting cloud client computer.

8. The computer program product as set forth in claim 1 further comprising program instructions stored or encoded by the computer readable storage memory device to receive the transmitted auditable data items by a cloud client computer, and to perform compliance analysis against one or more compliance policies by the cloud client computer.

9. A system for providing auditable data concerning actions in a cloud computing environment, comprising:

a computing platform having a processor or circuit for performing a logical process and a tangible, computer readable storage memory device;

program instructions encoded by the tangible, computer readable storage memory device to cause the processor to operate a cloud service which performs the steps of:

responsive to receiving an auditable data request from a cloud client computer for a customer, querying a plurality of cloud application services for auditable data retained in cloud application services data storage relevant to the customer resultant from computing actions taken on behalf of the customer;

receiving one or more responses to the querying from the plurality of cloud application services indicating available retained customer-relevant auditable data items;

responsive to finding customer-relevant auditable data items stored by the cloud application services, transmitting a list of the available auditable data items to the cloud client computer, wherein the list contains a geographical storage location identifier of each data item;

subsequent to transmitting the list, receiving from the cloud client computer a selection of less than all of the listed auditable data items;

retrieving from the cloud application services the selected auditable data items;

transmitting to the cloud client computer the retrieved auditable data items;

thereby avoiding a need for the cloud client computer to store the location of auditable data items at the cloud application services; and wherein the querying of cloud application services, receiving responses, transmitting a list, receiving a selection, retrieving the selected auditable data items, and transmitting the retrieved auditable data items are performed as a cloud service separate from the cloud client computer and from the plurality of cloud application services, thereby avoiding the need for the cloud client computer to store the location of auditable.

10. The system as set forth in claim 9 wherein the program instructions further comprise program instructions for, prior to the receiving of an auditable data request, performing cloud service registration of a client device by creating and assigning a unique identifier to a cloud client computer, and for sharing a security artifact between a cloud computing server and the cloud client computer.

11. The system as set forth in claim 9 wherein the program instructions further comprise program instructions for, prior to or concurrently with receiving a data request from the cloud client computer, negotiating between the cloud client computer and the cloud computing server a mutually-agreeable data exchange format in which requested auditable data will be delivered to the cloud client computer.

12. The system as set forth in claim 9 wherein determining that one or more auditable data items are available by the query request handler comprises determining if the requester is entitled to each of the available auditable data items, and removing from the list each auditable data item to which the requester is not entitled.

13. The system as set forth in claim 9 wherein the program instructions further comprise program instructions for issuing a authentication token to the cloud client computer prior to the receiving an auditable data request, wherein the determining that one or more auditable data items are available comprises extracting the previously-issued token from the auditable data request, and wherein the transmitting of a list of available auditable data items is prevented responsive to the extracted token not being associated with the requesting cloud client computer or responsive to a token being not found in the received auditable data request.

14. The system as set forth in claim 9 wherein the preparing of the requested auditable data items by the data request handler further comprises performing compliance analysis against one or more compliance policies, and wherein the transmitting of the prepared data items further comprises transmitting one or more results of the compliance analysis.

15. The system as set forth in claim 14 wherein the performing of compliance analysis is performed by a cloud service provider computer which is separate from a cloud service provider which received the request for auditable data items and which is separate from the requesting cloud client computer.

16. The system as set forth in claim 9 further comprising a cloud client computer for receiving the transmitted auditable data items, the cloud client computer also performing compliance analysis against one or more compliance policies.

17. The computer program product as set forth in claim 9 wherein the list further comprises one or more descriptors selected from the group consisting of an application instance identifier for each data item, an event category of each data item, a quantity of each data item, and a data exchange format for each data item, and wherein the event category comprises one or more categories selected from the group consisting of a security event, an application event, a security violation event, and an auditing event.

18. A method for a compliance cloud computing server processor to operate a cloud service to provide auditable data concerning actions in a cloud computing environment, comprising:
   responsive to receiving an auditable data request from a cloud client computer for a customer, querying by the processor a plurality of cloud application services for auditable data retained in cloud application services data storage relevant to the customer-resultant from computing actions taken on behalf of the customer;
   receiving by the processor one or more responses to the querying from the plurality of cloud application services indicating available retained customer-relevant auditable data items;
   responsive to finding customer-relevant auditable data items stored by the cloud application services, transmitting by the processor a list of the available auditable data items to the cloud client computer, wherein the list contains a geographical storage location identifier of each data item;
   subsequent to transmitting the list, receiving by the processor from the cloud client computer a selection of less than all of the listed auditable data items;
   retrieving by the processor from the cloud application services the selected auditable data items;
   transmitting by the processor to the cloud client computer the retrieved auditable data items;
   thereby avoiding a need for the cloud client computer to store the location of auditable data items at the cloud application services; and
   wherein the querying of cloud application services, receiving responses, transmitting a list, receiving a selection, retrieving the selected auditable data items, and transmitting the retrieved auditable data items are performed as a cloud service separate from the cloud client computer and from the plurality of cloud application services, thereby avoiding the need for the cloud client computer to store the location of auditable.

19. The method as set forth in claim 18 wherein the program instructions further comprise program instructions for, prior to the receiving of an auditable data request, performing by the cloud computing server cloud service registration of a client device by creating and assigning a unique identifier to a cloud client computer, and sharing a security artifact between a cloud computing server and the cloud client computer.

20. The method as set forth in claim 18 wherein the program instructions further comprise program instructions for, prior to or concurrently with the receiving of the data request from the cloud client computer, negotiating between the cloud client computer and the cloud computing server a mutually-agreeable data exchange format in which requested auditable data will be delivered to the cloud client computer.

21. The method as set forth in claim 18 wherein the determining that one or more auditable data items are available comprises determining if the requester is entitled to each of the available auditable data items, and to remove from the list each auditable data item to which the requester is not entitled.

22. The method as set forth in claim 18 wherein the program instructions further comprise program instructions for issuing an authentication token to the cloud client computer prior to the receiving an auditable data request, wherein the determining that one or more auditable data items are available comprises extracting the previously-issued token from the auditable data request, and wherein the transmitting of a list of available auditable data items is prevented responsive to the extracted token not being associated with the requesting cloud client computer or responsive to a token being not found in the received auditable data request.

23. The method as set forth in claim 18 wherein the preparing of the requested auditable data items further comprises performing compliance analysis against one or more compliance policies, and wherein the transmitting of the prepared data items further comprises transmitting one or more results of the compliance analysis.

24. The method as set forth in claim 23 wherein the compliance analysis is performed by a cloud service provider computer which is separate from a cloud service provider which received the request for auditable data items and which is separate from the requesting cloud client computer.

25. The method as set forth in claim 18 wherein the program instructions further comprise program instructions for receiving the transmitted auditable data items by a cloud client computer, and performing compliance analysis against one or more compliance policies by the cloud client computer.

* * * * *